(12) United States Patent
Kodama et al.

(10) Patent No.: US 6,523,814 B2
(45) Date of Patent: Feb. 25, 2003

(54) LIQUID FILLED VIBRATION ISOLATION DEVICE

(75) Inventors: Yosei Kodama, Osaka (JP); Yukio Takashima, Osaka (JP)

(73) Assignee: Toyo Tire & Rubber Co., Ltd, Osaka (JP)

( * ) Notice: Subject to any disclaimer, the term of this patent is extended or adjusted under 35 U.S.C. 154(b) by 0 days.

(21) Appl. No.: 10/074,417

(22) Filed: Feb. 12, 2002

(65) Prior Publication Data

US 2002/0195757 A1 Dec. 26, 2002

(30) Foreign Application Priority Data

Jun. 21, 2001 (WO) .................. PCT/JP01/05336

(51) Int. Cl.[7] .................. F16F 13/10; B60K 5/12
(52) U.S. Cl. .................. 267/140.13
(58) Field of Search .................. 267/140.11, 140.13

(56) References Cited

U.S. PATENT DOCUMENTS

| | | | | |
|---|---|---|---|---|
| 4,657,232 A | * | 4/1987 | West | 267/140.11 |
| 5,259,598 A | * | 11/1993 | Hibi et al. | 267/140.13 |
| 5,443,245 A | * | 8/1995 | Bellamy et al. | 267/140.13 |
| 5,964,456 A | * | 10/1999 | Someya | 267/140.13 |
| 6,250,616 B1 | * | 6/2001 | Suzuki et al. | 267/140.13 |

FOREIGN PATENT DOCUMENTS

| | | |
|---|---|---|
| JP | 7-77234 | 3/1995 |
| JP | 10-9333 | 1/1998 |
| JP | 2000-65124 | 3/2000 |
| JP | 2000-65125 | 3/2000 |

* cited by examiner

*Primary Examiner*—Christopher P. Schwartz
(74) *Attorney, Agent, or Firm*—Jordan and Hamburg LLP

(57) ABSTRACT

A liquid-in vibration-isolating device, used to support a vibration generating source such as a vehicle engine for the purpose of vibration isolation, prevents hitting sound or adsorption of a diaphragm due to abutment against a partition member and proper functioning of the device is maintained, without increasing the volume of sub-liquid chamber on the diaphragm side. The device includes a cylindrical body fitting and a boss fitting connected via a vibration isolating substrate. A diaphragm is provided on an opening portion at the upper extremity, being partitioned into a main liquid chamber on the vibration isolating substrate side and a sub-liquid chamber on the diaphragm side by means of a partition member. Both liquid chambers are connected through an orifice of the outer circumferential portion. Multiple convex portions are provided for restraining the diaphragm from abutting against the partition member.

10 Claims, 5 Drawing Sheets

LIQUID FILLED VIBRATION ISOLATION DEVICE

FIELD OF THE INVENTION

This invention relates to a liquid-in vibration-isolating device used to support a vibration generating source such as vehicle engine for the purpose of vibration isolation.

DESCRIPTION OF THE RELATED ART

A liquid-in vibration isolator, in which liquid is contained inside a body portion equipped with a vibration isolating substrate made of a rubber elastomer, has heretofore been known as a mount supporting a vibration generating source such as vehicle engine so as not to transmit its vibration to a vehicle body and the like.

For example, in an official gazette JP-A-7-77234, a liquid-in vibration isolator is disclosed, wherein a vibration isolating substrate made of a rubber elastomer at one opening portion of a cylindrical body fitting and a diaphragm made of a rubber film at the other opening portion are fitted and adhered under sealed condition, liquid is contained in an inner chamber surrounded by these members, a partition member with an orifice made on the outer circumferential portion being interposed between the vibration isolating substrate and the diaphragm, and being partitioned into a main liquid chamber on the side of the vibration isolating substrate and a sub-liquid chamber on the side of the diaphragm, and both liquid chambers being connected by the orifice formed on the outer circumferential portion of the partition member.

The liquid-in vibration isolating device is used by connecting a boss fitting stuck to an axis center of the vibration isolating device to a vibration generating source side and the cylindrical body fitting to a support side, the vibration damping and vibration isolating functions are fulfilled by the liquid flowing effect between both liquid chambers produced by the orifice and the vibration absorbing effect of the vibration isolating substrate.

As for the liquid-in vibration isolating device, the orifice on the outer circumferential portion of the partition member is normally set so that the dynamic spring rate can be reduced in a relatively low frequency band (10 to 15 Hz) such as shake vibration, effects of reduction of dynamic spring rate cannot be obtained in a relatively high frequency band (100 to 200 Hz) such as fraught sound and the like. For that purpose, as for the liquid-in vibration isolating device, the partition member comprises a partition plate member made of an elastic film at its center portion and an orifice member disposed on the diaphragm side of the partition plate member, hollow space between the center plate portion of the orifice member and the elastic film is formed as a second sub-liquid chamber, independently of the orifice on the outer circumferential portion which passes through the sub-liquid chamber on the diaphragm side and the main liquid chamber, the orifice hole is opened on the center plate portion from the sub-liquid chamber to the second sub-liquid chamber, so as to reduce the dynamic spring rate in both frequency bands of shake vibration and fraught sound.

In such configuration, as the pressure of the main liquid chamber varies due to vibration, mainly vibration in the vertical direction, on the vibration generating source side such as engine connected to the boss fitting, inside liquid flows and liquid in the sub-liquid chamber increases/decreases, and consequently the diaphragm constituting a chamber wall of the sub-liquid chamber approaches the partition member and deforms in the direction of separation.

When the diaphragm is displaced greatly toward the partition member side especially due to load in the direction of compression during this deformation, the diaphragm abuts extensively against the plate surface of the center portion of the partition member, especially against the surface of the center plate portion of the orifice member. Therefore, if the center plate portion of the orifice member is in the form of a plane, it is apprehended that the diaphragm abuts as surface contact to produce hitting sound and falls into the state of adsorption against the plane of the center plate portion to impair the movement of the diaphragm. In particular, when the orifice hole passing through the second sub-liquid chamber is formed on the center plate portion of the partition member, it is feared that the orifice hole is covered to disable its function. Furthermore, there is the possibility of taking scratches on a part of the diaphragm at the opening end of the orifice hole.

Besides, even if the partition member is made up of a single member which does not form the second sub-liquid chamber, similar problems will occur when the center plate portion of the partition member assumes in the form of a plane and the diaphragm abuts on the center plate portion under a load.

If the volume of the sub-liquid chamber on the diaphragm side is set sufficiently large so as not to cause the problems described above, the vibration isolating device itself grows larger, and so it is not preferable from the viewpoint of onboard of a vehicle and the like.

The present invention provides a liquid-in vibration isolating device improved so as not to cause the problems described above.

DISCLOSURE OF THE INVENTION

A liquid-in vibration isolating device of the present invention comprises a cylindrical body fitting, a boss fitting disposed at an axis center of the cylindrical body fitting, a vibration isolating substrate made of a rubber elastomer material interposed between a portion of one opening side of the cylindrical body fitting and the boss fitting to connect both fittings, a diaphragm made of a rubber film fitted and adhered to a portion on the other opening side of the cylindrical body fitting, liquid being contained in an inner chamber surrounded by these members, the inner chamber being partitioned into a main liquid chamber on the side of the boss fitting and a sub-liquid chamber on the side of the diaphragm by a partition member interposed between the vibration isolating substrate and the diaphragm, and both liquid chambers being connected by an orifice formed on the outer circumferential portion of the partition member, wherein multiple convex portions restraining the abutment of the diaphragm against the partition member are provided on at least either an inner surface of the diaphragm, opposed to each other in the sub-liquid chamber, or a plate surface of the partition member. It is preferable that multiple convex portions are provided on a plane opposed to the diaphragm at the center plate portion of the partition member to restrain the diaphragm from abutting.

According to the liquid-in vibration isolating device, multiple convex portions are provided on at least either an inner surface of the diaphragm or a plate surface of the partition member, for example, on a plane of the center plate portion of the partition member, to restrain the abutment thereof when the sub-liquid chamber on the diaphragm side reduces its pressure and gets contracted and the diaphragm approaches and abuts the partition portion, due to large displacement caused by a vibration load in the vertical direction, especially due to load in the direction of compression. Accordingly, since the diaphragm abuts by being scattered under point or line contact conditions at the convex portions and can also be restrained from abutting by surface contact, hitting sound due to abutment is not produced at all and the diaphragm will not become in the state of adsorption on the plate surface of the partition member.

Furthermore, under a condition where the diaphragm abuts the partition member as described above, since space is kept between the diaphragm and the partition member other than the convex portions to secure liquid flow in the sub-liquid chamber, there is no possibility of impairing the function of the diaphragm.

The partition member of the liquid-in vibration isolating device comprises a partition plate member made of an elastic film at the center portion and an orifice member disposed on the diaphragm side of the partition plate member, the orifice connecting the main liquid chamber and the sub-liquid chamber being formed on the outer circumferential portion thereof, a second sub-liquid chamber being formed between the center plate portion of the orifice member and the elastic film, independently of a first sub-liquid chamber on the diaphragm side, and an orifice hole passing through from the first sub-liquid chamber to the second sub-liquid chamber being opened on the center plate portion of the orifice member.

In this case, with the orifice on the outer circumferential portion mainly set for shake vibration and the orifice hole passing through the second sub-liquid chamber mainly set for fraught sound, each dynamic spring rate can be reduced in different frequency ranges such as frequency range for shake vibration and relatively high frequency range for fraught sound and the like, with the result that vibration is effectively damped in a wider frequency range.

And, as mentioned above, when the diaphragm abuts the partition member, the convex portions can restrain the diaphragm from abutting so as not to cause surface contact, hollow spaces can be kept at the portions other than the convexes, and liquid flow in the first sub-liquid chamber can be secured. Therefore, it is not apprehended that the function of the diaphragm is impaired, and the orifice hole is not covered completely or earlier, with the result that the function of the orifice hole can be maintained properly.

Further, since the diaphragm does not come into contact with the orifice hole portion at all, the diaphragm is not broken even if the volume of the first sub-liquid chamber is small, thus the durability can be maintained properly.

As for the liquid-in vibration isolating device of the aforementioned configuration, it is preferable that an opening as the second orifice provided on the center plate portion of the orifice member is provided eccentrically on the opposite side to the position of the interconnecting portion from the first orifice on the outer circumferential portion to the first sub-liquid chamber. Thereby, mutual interference between the orifice on the outer circumferential portion and the orifice hole can be prevented, allowing the characteristics to be stabilized further.

As for the liquid-in vibration isolating device of the aforementioned configuration, multiple convex portions for restraining the diaphragm from abutting are disposed on the center plate portion of the orifice member between the interconnecting portion from the orifice on the outer circumferential portion of the orifice member and the orifice hole, so as to keep the predetermined space along the direction of liquid flow. In this case, even if numbers of convex portions are formed, liquid flow between the interconnecting portion from the orifice on the outer circumferential portion and the orifice hole can be secured properly.

Multiple convex portions for restraining the diaphragm from abutting are disposed on the center plate portion of the orifice member nearly radially centering the orifice hole. Thereby, liquid flow into the orifice hole in the sub-liquid chamber is not impaired, thus the function can be maintained properly.

BEST MODE FOR CARRYING OUT THE INVENTION

Figure 1:
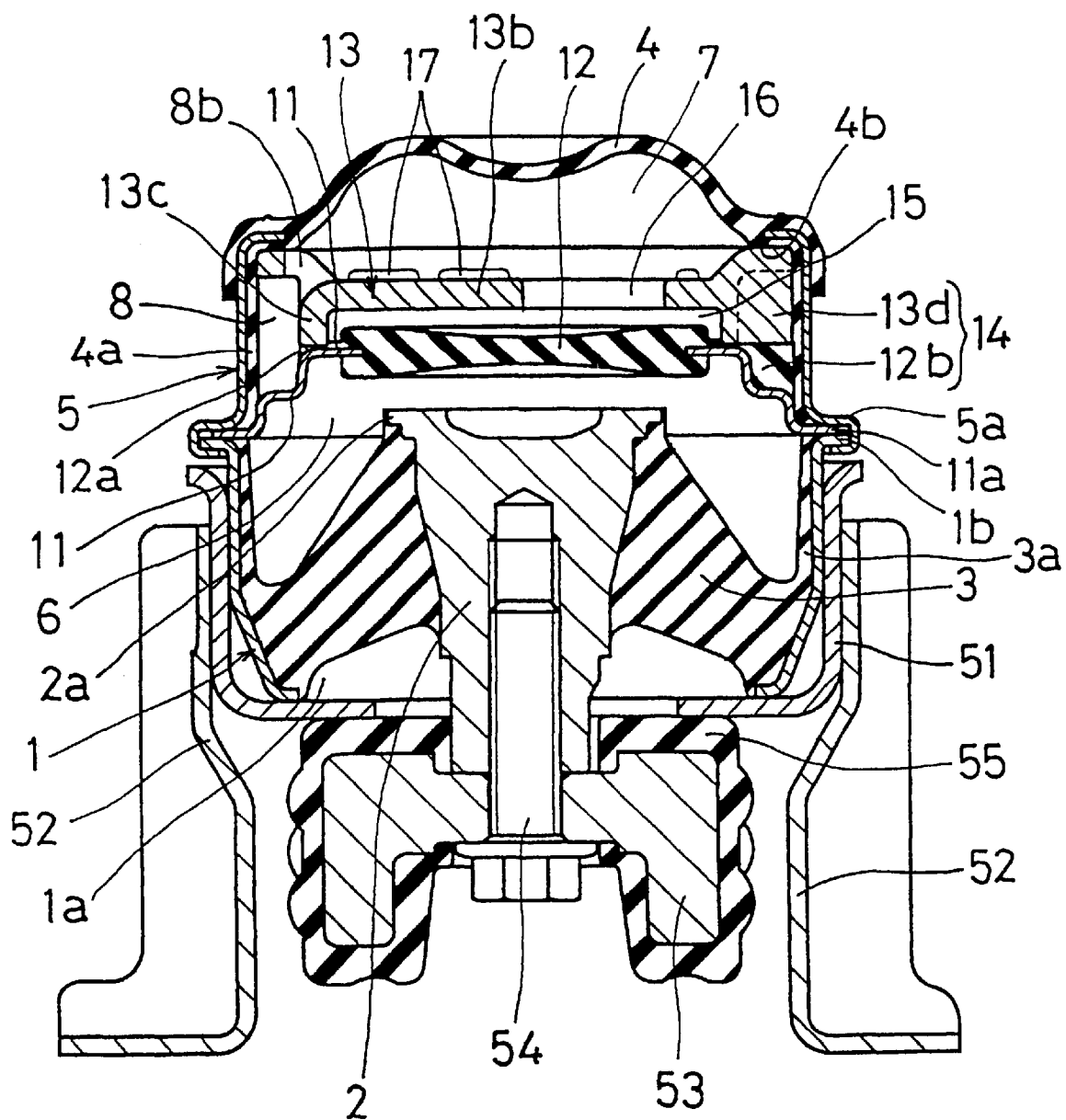
FIG. 1 is a sectional view of a liquid-in vibration isolating device of the present invention.
Figure 2:
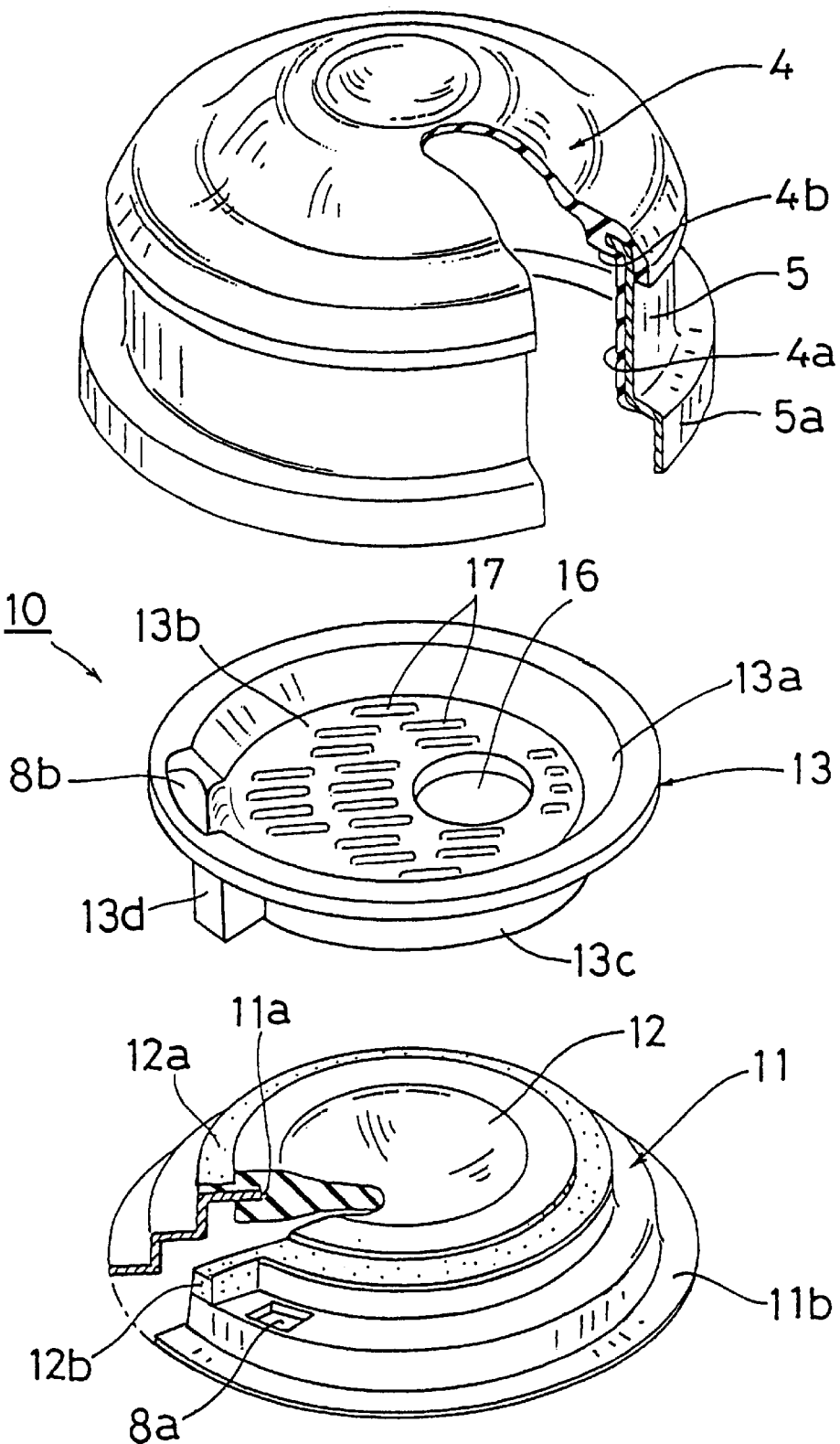
FIG. 2 is a partially cutaway view in perspective of the liquid-in vibration isolating device separately showing each member of a diaphragm and a partition member.

The embodiments of this invention will be hereinafter described by way of examples with reference to the accompanying drawings.

In the drawings, the reference numeral 1 indicates a cylindrical body fitting assuming rough cup form of bottom open type having an opening 1a. The reference numeral 2 indicates a boss fitting having a flange portion 2a of large diameter disposed on an axial center portion inwards of the cylindrical body fitting 1 with upper extremity spreading in the form of an umbrella. The reference numeral 3 indicates a vibrating isolating substrate made of a rubber elastomer stuck under sealed condition and interposed by a vulcanization adhering means at the lower portion on the one of the opening side of the cylindrical body fitting 1, for example, between the lower extremity of the inner circumferential surface and the top of the boss fitting 2. The cylindrical body fitting 1 is connected via the vibration isolating substrate 3 with the boss fitting 2, and the bottom opening 1a of the cylindrical body fitting 1 is blocked. The reference numeral 4 indicates a diaphragm made of a rubber film connected at the upper extremity 1b on the other opening side of the cylindrical body fitting 1 so as to cover the top opening opposite to the vibration isolating substrate 3. And, liquid is contained in a chamber surrounded by these members, that is, an inner chamber between the vibration isolating substrate 3 and the diaphragm 4.

Furthermore, a partition member 10 is interposed between the vibration isolating substrate 3 and the diaphragm 4, the inner chamber is partitioned and configured into a main liquid chamber 6 on the side of the boss fitting 2 and a first sub-liquid chamber 7 on the side of the diaphragm 4, and both liquid chambers 6, 7 are connected by an orifice 8 for shake vibration on the outer circumferential portion of the partition member 10.

The cylindrical body fitting 1 is press-fitted and held in a retainer sleeve 51 assuming rough cup form of bottom open type, and fixed and supported on a frame and the like on the vehicle-body side by a support member 52 stuck to the outer circumference of the retainer sleeve 51. Of course, the cylindrical body fitting 1 can also be supported by connecting and securing other supporting means to the outer circumference of the cylindrical body fitting 1.

As for the boss fitting 2, the upper terminal edge thereof is close to the top opening of the cylindrical body fitting 1, the lower extremity projects downwardly from the bottom opening 1a of the cylindrical body fitting 1 and the bottom opening 51a of the retainer sleeve 51, and a connecting member 53 on the side of the vibration generating source such as engine is fastened to a bolt 54. The reference numeral 55 indicates a rubber portion fitted to the outer circumference of the connecting member 53, which can restrain from largely displacing further upwards by abutting on the bottom portion of the retainer sleeve 51. FIG. 1 shows a condition where no load such as engine is applied, and under loading condition the rubber portion 55 is kept to be isolated from the bottom of the retainer sleeve 51.

As shown in the drawings, the vibration isolating substrate 3 is roughly in the form of an umbrella, the diameter of which increases toward the lower side, the top thereof is vulcanization adhered to the outer circumference of a shaft containing a flange portion 2a of the boss fitting 2, and the lower extremity is vulcanization adhered to the inner circumference of the lower extremity of the cylindrical body fitting 1. A rubber layer 3a integrally formed with the vibration isolating substrate 3 is fitted on the inner circumference of the cylindrical body fitting 1.

The diaphragm 4 is vulcanization adhered, on the outer circumference thereof, to a reinforcing cylindrical member 5, and is bonded to the upper extremity 1b of the cylindrical body fitting 1 by caulking and fastening the lower extremity 5a of the cylindrical member 5. Further, the diaphragm 4 has a given curvature and sectional length so as to naturally follow up variation of liquid pressure in the inner chamber. A cylindrical rubber portion 4a of a given thickness vulcanization adhered together with the diaphragm 4 is fitted on the inner circumference of the cylindrical member 5.

As shown in the drawings, the partition member 10 comprises a partition plate member 11 equipped with an elastic film 12 stuck to the central opening portion 11a by the vulcanization adhering means, and an orifice member 13 disposed opposite to the side of the first sub-liquid chamber 7 of the partition plate member 11. The orifice member 13 is press-fitted and adhered through the cylindrical rubber portion 4a to the inside of the cylindrical member 5, and the outer circumferential edge portion 11b of the partition plate member 11 is adhesively held and secured to the portion caulked and fastened between the lower extremity 5a of the cylindrical member 5 and the upper extremity 1b of the cylindrical body fitting 1. The reference numeral 4b indicates a step portion for positioning formed on the under surface of the circumferential edge portion of the diaphragm 4, on which the outer circumferential edge portion of the orifice member 13 abuts. Thereby, the partition member 10 is disposed at the position where the diaphragm 4 may abut.

The orifice member 13 has an outer circumferential portion 13a assuming a cone shape, a center plate portion 13b in the form of a plane, and a ring-shaped convex portion 13c on the under surface at the circumferential edge portion of the center plate portion. The ring-shaped convex portion 13c is pressed and brought into contact with the circumferential portion 12a of the elastic film 12 so as to keep the state of sealing off. Between the partition plate member 11 and the orifice member 13 are partitioned as an inward portion and a ring-shaped outward portion. The orifice 8 assuming rough ring-shape, partly occupied by a screen portion 14, is formed outwardly from the portion press-fitted and brought into contact by the ring-shaped convex portion 13c, between the outer circumferential portion 13a of the orifice member 13 and the stepped outer circumferential portion of the partition plate member 11.

The screen portion 14 is formed by a part 13d of the orifice member 13 and a rubber portion 12b vulcanization adhered to the partition plate member 11. The reference numerals 8a, 8b indicate interconnecting portions from the orifice 8 to the main liquid chamber 6 and the first sub-liquid chamber 7.

Further, hollow space surrounded by the center plate portion 13b of the orifice member 13 formed inwardly from the portion press-fitted and brought into contact by the ring-shaped convex portion 13c and the top surface of the elastic film 12 is formed as a second sub-liquid chamber 15, and an orifice hole 16 for fraught sound passing through from the first sub-liquid chamber 7 to the second sub-liquid chamber 15 is opened on the center plate portion 13b of the orifice member 13.

Although the orifice hole 16 may be located anywhere on the center plate portion 13b, it may be eccentrically located on the side opposite to the position of a pierced portion 8b, preferably opposed to each other by nearly 180°, in order to secure stable characteristics by preventing mutual interference between the pierced portion 8b through the orifice 8 and the orifice hole 16. Position and aperture diameter of the orifice hole 16 can be appropriately set according to the vibration isolating properties.

Furthermore, in the case of the present invention, on the one of the inner surface of the diaphragm 4 and the plate surface of the partition member 10, which are oppositely disposed in the first sub-liquid chamber 7, for example, on the surface of the center plate portion 13b of the orifice member 13 opposite to the diaphragm 4, multiple convex portions 17 are disposed at a given space to prevent from occurring hitting sound or adsorption by restraining abutment so as to get rid of surface contact when the diaphragm 4 is deformed toward the side of the partition member 10.

As for shape, size, number and layout configuration and the like of the convex portion 17, various embodiments can be carried out if abutment can be restrained to get rid of surface contact when the diaphragm 4 abuts against the partition member 10.

For example, in case of the embodiments shown in the drawings, multiple convex portions 17 assuming the form of a relatively small rib of rough semi-circle sectional area with rounded top surface are disposed in parallel at a given interval nearly all over the center plate portion 13b. The dimensions of the convex portion 17 in the form of a rib is, for example, 0.5 to 1.5 mm in height, 1.0 to 2.0 mm in width, and 2.0 to 5.0 mm in arrangement intervals thereof. Since it is feared that liquid flow is impaired when the convex portion 17 in the form of a rib becomes too long, its length shall be up to 10 mm at the utmost.

Figure 3:
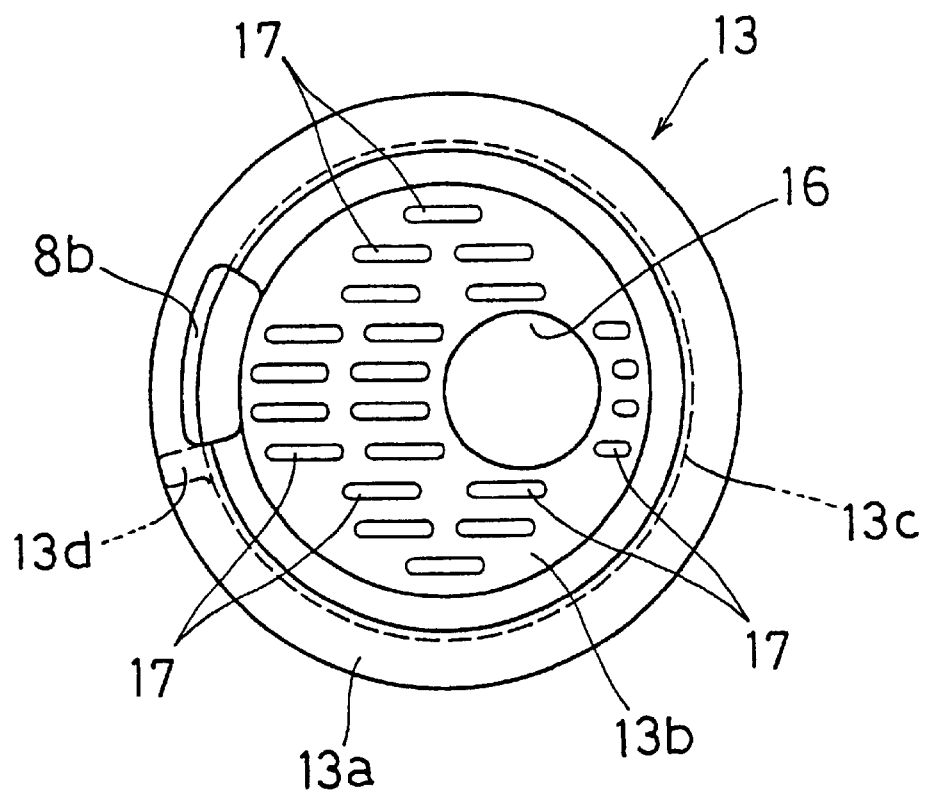
FIG. 3 is a plan view of an orifice member constituting the partition member in FIG. 2.

As shown in FIG. 3, in case of in the form of a rib, the convex portions 17 may be arranged in a line to be at a given interval along the direction of liquid flow so as to secure proper liquid flow between the pierced portion 8b of the orifice 8 and the orifice hole 16, at the outer circumferential portion 13a of the orifice member 13.

Figure 5:
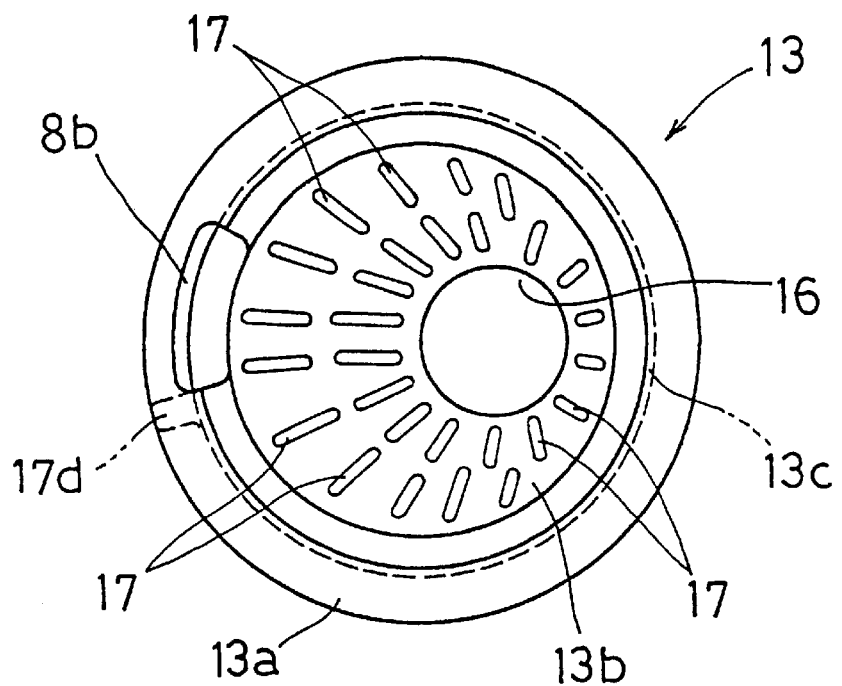
FIG. 5 is a plan view showing another example of the orifice member.
Figure 6:
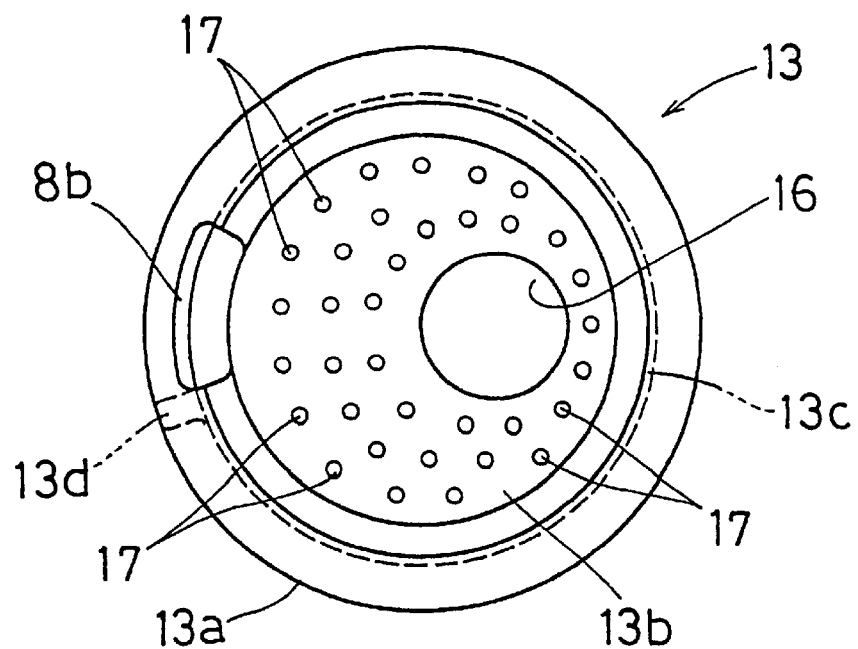
FIG. 6 is a plan view showing further example of the orifice member.

As shown in FIG. 5, multiple convex portions 17 in the form of a rib can also be arranged roughly radially centering the orifice hole 16 on the center plate portion 13b. Besides, as shown in FIG. 6, the convex portion 17 of plane circle can also be arranged at the predetermined intervals in all directions or scatteringly.

The orifice member 13 made of metals such as aluminum or its alloy and formed pieces of ceramics or synthetic resin materials is easy to achieve dimensional accuracy and thus is especially preferable when carrying out the embodiments. In this case, the convex portions 17 are also formed according to the forming operations. As for the partition plate member 11 of the partition member 10, it is easy to vulcanization adhere the elastic film 12 such as rubber to the center opening portion 11a of the pressed metal plate for production. This can improve dimensional accuracy of sectional area of the orifice 8 formed by both members.

As aforementioned, in reference to the liquid-in vibration isolating device of the present invention constituting the configuration described above, the cylindrical body fitting 1 is press-fitted in the retainer sleeve 51, and fixed on a frame and the like on the vehicle body side by the support member 52 stuck to the retainer sleeve 51, and the connecting member 53 on the side of the vibration generating source such as engine is fastened to the boss fitting 2, whereby the engine and the like is supported and used in the state of hanging.

When vibration is propagated from the vibration generating source such as engine under this support condition, the vibration isolating substrate 3 is deformed thereby, and contained liquid then flows via the orifice 8 for shake vibration on the outer circumferential portion of the partition member 10 or the orifice hole 16 opened on the center plate portion 13b of the orifice member 13 between the main liquid chamber 6 and the first sub-liquid chamber 7 and/or between the first sub-liquid chamber 7 and the second sub-liquid chamber 15, thus reducing dynamic spring rate effectively in wider frequency range than ever due to each resonance properties of the orifice 8 and the orifice hole 16.

That is, the orifice 8 on the outer circumferential portion is set to effectively exert vibration damping effect in a frequency range (10 to 15 Hz) of shake vibration. Besides, since the second sub-liquid chamber 15 is provided through the orifice hole 16 on the first sub-liquid chamber 7, by setting the orifice hole 16 so as to effectively exert vibration damping effect in a range of relatively high frequency (100 to 200 Hz) of fraught sound and the like, each dynamic spring rate can be reduced in the aforementioned different frequency range, with the result that vibration is effectively damped in a wider frequency range to raise noise reduction effects.

Figure 4A:
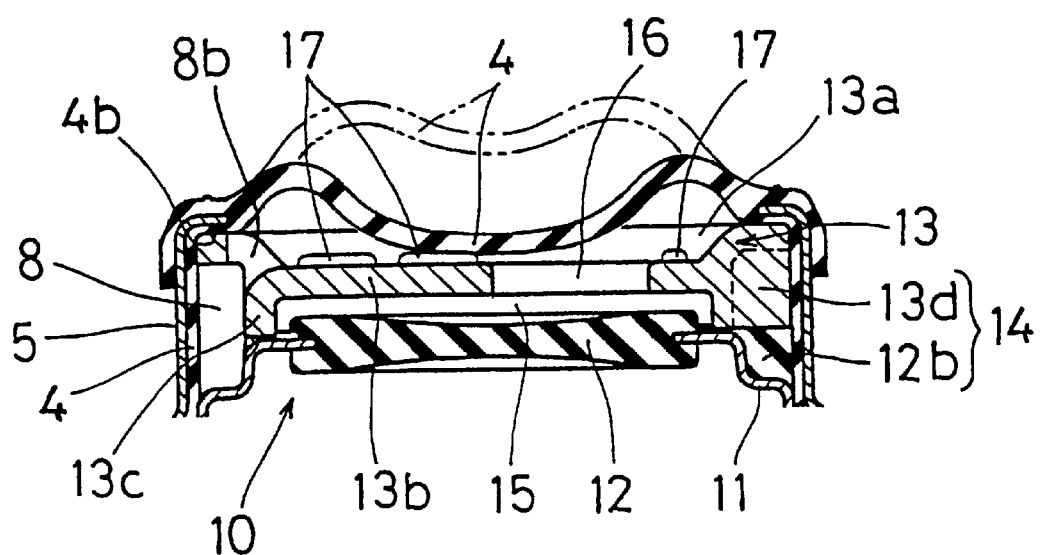
FIGS. 4a and 4b are partial sectional views showing the state of contact with the partition member portion of the diaphragm of the device.
Figure 4B:
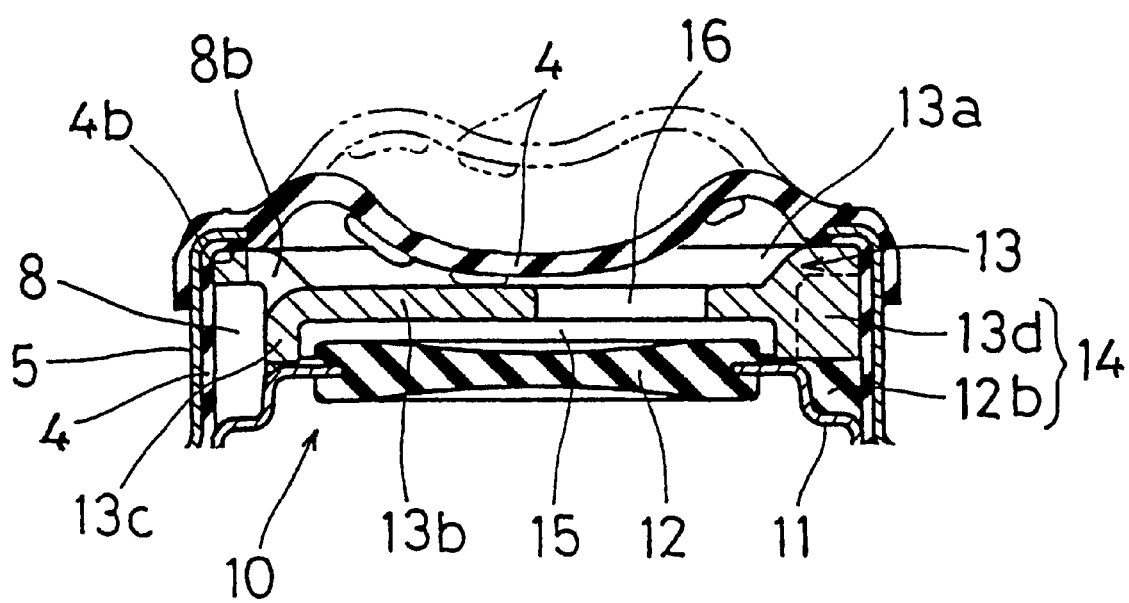

And, when the first sub-liquid chamber 7 on the side of the diaphragm 4 contracts and the diaphragm 4 approaches and abuts the partition member 10 due to large displacement caused by a vibration load in the vertical direction, especially due to load in the direction of compression, as shown in FIGS. 4a and 4b, the diaphragm 4 will abut on multiple convex portions 17 provided on the center plate portion 13b of the partition member 13 opposite to the diaphragm 4 (FIG. 4a) or the convex portions 17 provided on the diaphragm 4 will abut the center plate portion 13b of the partition member 13 (FIG. 4b), while being scattered under the conditions of point or line contact, thus restraining abutment so as not to cause surface contact. Accordingly, hitting sound is not produced at all due to abutment, and the diaphragm 4 does not fall into the state of being absorbed by the plane of the center plate portion 13b.

Besides, under a condition where the diaphragm 4 abuts the center plate portion 13b of the orifice member 13, since there is a hollow space between the diaphragm 4 and the center plate portion 13b other than the convex portions 17 (See FIGS. 4 and 4b), liquid flow in the first sub-liquid chamber 7 can be secured sufficiently, and it is not apprehended that the orifice hole 16 is blocked up.

Further, although the convex portions 17 for restraining abutment of the diaphragm 4 are provided on the center plate portion 13b of the orifice member 13 constituting the partition member 10 in the embodiments shown above in the drawings, these convex portions can also be provided on the inner surface of the diaphragm 4. In this case, since the diaphragm abuts against the partition member under the conditions of point or line contact, this can prevent from producing the hitting sound due to abutment and/or from falling into the absorbing conditions.

The present invention is not limited to the vibration isolating device of the type made up of the partition member 10, consisting of the partition plate member 11 and the orifice member 13, which forms the second sub-liquid chamber 15 and the orifice hole 16 passing through the second sub-liquid chamber 15, but is also applicable to the type, with multiple convex portions provided for restraining the diaphragm from abutting, similar to the embodiments described above, in which the partition member comprises a single member that does not form the second sub-liquid chamber, the center plate portion of the partition member opposed to the diaphragm assumes in the form of a plane, and the diaphragm abuts the center plate portion under a load. In this case, similar to the embodiments described above, hitting sound due to abutment of the diaphragm and adsorption can also be avoided.

Industrial Applicability

A liquid-in vibration isolating device of the present invention can restrain a diaphragm from abutting against a partition member so as not to become surface contact without increasing the volume of a sub-liquid chamber on the diaphragm side, prevent from producing the hitting sound and adsorption, hold a hollow space even in the state Qf abutment, secure liquid flow, and maintain the function properly, thus putting to use appropriately when supporting the vibration generating source such as vehicle engine for the purpose of vibration isolation.

What is claimed is:

1. A liquid filled vibration isolating device comprising a cylindrical body fitting, a boss fitting disposed at an axis center of the cylindrical body fitting, a vibration isolating substrate made of a rubber elastomer material interposed between a portion of one opening side of the cylindrical body fitting and the boss fitting to connect both fittings, a diaphragm made of a rubber film fitted and adhered to a portion on the other opening side of the cylindrical body fitting, liquid being contained in an inner chamber surrounded by the cylindrical body fitting, the boss fitting, the vibration isolating substrate and the diaphragm, the inner chamber being partitioned into a main liquid chamber on the side of the boss fitting and a sub-liquid chamber on the side of the diaphragm by a partition member interposed between the vibration isolating substrate and the diaphragm, and both liquid chambers being connected by an orifice formed on the outer circumferential portion of the partition member, and multiple convex portions restraining abutment of the diaphragm against the partition member are provided on at least either an inner surface of the diaphragm, opposed to each other in the sub-liquid chamber, or a plate surface of the partition member, said multiple convex portions being disposed on opposite sides of the orifice, wherein the partition member comprises a partition plate member made of an elastic film at the center portion and an orifice member disposed on the diaphragm side of the partition plate member, the orifice connecting the main liquid chamber and the sub-liquid chamber being formed on the outer circumferential portion thereof, a second sub-liquid chamber being formed between the center plate portion of the orifice member and the elastic film, independent of a first sub-liquid chamber on the diaphragm side, and an orifice hole passing through from the first sub-liquid chamber to the second sub-liquid chamber being opened on the center plate portion of the orifice member.

2. The liquid filled vibration isolating device as set forth in claim 1, wherein the orifice hole is provided eccentrically on the side opposite to the position of the interconnecting portion from the first orifice on the outer circumferential portion of the orifice member to the first sub-liquid chamber.

3. The liquid filled vibration isolating device as set forth in claim 1 or 2, wherein multiple convex portions for restraining the diaphragm from abutting are disposed on the center plate portion of the orifice member between the interconnecting portion from the orifice on the outer circumferential portion of the orifice member and the orifice hole, so as to keep the predetermined hollow space along the direction of liquid flow.

4. The liquid filled vibration isolating device as set forth in claim 1 or 2, wherein multiple convex portions for restraining the diaphragm from abutting are disposed on the center plate portion of the orifice member nearly radially centering the orifice hole.

5. The liquid filled vibration isolating device as set forth in claim 1, wherein said multiple convex portions are provided on a plane opposed to each other and to the diaphragm at the center plate portion of the partition member to restrain the diaphragm from abutting.

6. A liquid filled vibration isolating device comprising a cylindrical body fitting, a boss fitting disposed at an axis center of the cylindrical body fitting, a vibration isolating substrate made of a rubber elastomer material interposed between a portion of one opening side of the cylindrical body fitting and the boss fitting to connect both fittings, a diaphragm made of a rubber film fitted and adhered to a portion on the other opening side of the cylindrical body fitting, liquid being contained in an inner chamber surrounded by the cylindrical body fitting, the boss fitting, the vibration isolating substrate and the diaphragm, the inner chamber being partitioned into a main liquid chamber on the side of the boss fitting and a sub-liquid chamber on the side of the diaphragm by a partition member interposed between the vibration isolating substrate and the diaphragm, and both liquid chambers being connected by an orifice formed on the outer circumferential portion of the partition member, and multiple convex portions restraining abutment of the diaphragm against the partition member are provided on at least either an inner surface of the diaphragm, opposed to each other in the sub-liquid chamber, or a plate surface of the partition member, said multiple convex portions being disposed surrounding the orifice at spaced intervals, wherein the partition member comprises a partition plate member made of an elastic film at the center portion and an orifice member disposed on the diaphragm side of the partition plate member, the orifice connecting the main liquid chamber and the sub-liquid chamber being formed on the outer circumferential portion thereof, a second sub-liquid chamber being formed between the center plate portion of the orifice member and the elastic film, independent of a first sub-liquid chamber on the diaphragm side, and an orifice hole passing through from the first sub-liquid chamber to the second sub-liquid chamber being opened on the center plate portion of the orifice member.

7. The liquid filled vibration isolating device as set forth in claim 6, wherein said multiple convex portions are provided on a plane opposed to each other and to the diaphragm at the center plate portion of the partition member to restrain the diaphragm from abutting.

8. The liquid filled vibration isolating device as set forth in claim 6, wherein the orifice hole is provided eccentrically on the side opposite to the position of the interconnecting portion from the first orifice on the outer circumferential portion of the orifice member to the first sub-liquid chamber.

9. The liquid filled vibration isolating device as set forth in claim 6 or 8, wherein multiple convex portions for restraining the diaphragm from abutting are disposed on the center plate portion of the orifice member between the interconnecting portion from the orifice on the outer circumferential portion of the orifice member and the orifice hole, so as to keep the predetermined hollow space along the direction of liquid flow.

10. The liquid filled vibration isolating device as set forth in claim 6 or 8, wherein multiple convex portions for restraining the diaphragm from abutting are disposed on the center plate portion of the orifice member nearly radially centering the orifice hole.

* * * * *